US005664706A

United States Patent [19]

Cater

[11] Patent Number: 5,664,706

[45] Date of Patent: Sep. 9, 1997

[54] APPARATUS FOR DISPENSING LIQUID IN AEROSOL SPRAY FORM

[75] Inventor: Miro Stan Cater, Newtown, Conn.

[73] Assignee: Bespak Plc, Norfolk, United Kingdom

[21] Appl. No.: 383,479

[22] Filed: Feb. 2, 1995

[30] Foreign Application Priority Data

Oct. 13, 1994 [GB] United Kingdom .................... 9420678

[51] Int. Cl.[6] .................................................. G01F 11/00

[52] U.S. Cl. .................................... 222/321.2; 222/321.9; 239/333

[58] Field of Search .............................. 222/321.2, 321.8, 222/321.9, 341, 383.1, 385; 239/333

[56] References Cited

U.S. PATENT DOCUMENTS

| | | | |
|---|---|---|---|
| 3,724,723 | 4/1973 | Slavinski | 222/109 |
| 4,057,176 | 11/1977 | Horvath | 239/333 X |
| 4,089,442 | 5/1978 | Hafele et al. | 222/321 |
| 4,122,982 | 10/1978 | Giuffredi | 222/321.2 |
| 4,230,242 | 10/1980 | Meshberg | 222/321 |
| 4,274,560 | 6/1981 | Cater | 222/321 |
| 4,402,432 | 9/1983 | Corsette | 222/321 |
| 4,462,546 | 7/1984 | Saito et al. | 239/333 |
| 4,516,727 | 5/1985 | Saito et al. | 239/333 |
| 4,735,347 | 4/1988 | Shultz et al. | 222/321.2 |
| 4,776,498 | 10/1988 | Maerte et al. | 222/321 |
| 4,830,284 | 5/1989 | Maerte | 239/333 |
| 4,986,453 | 1/1991 | Lina et al. | 222/321.2 |
| 4,991,747 | 2/1991 | Van Brocklin | 239/333 X |
| 5,011,046 | 4/1991 | Graf et al. | 222/321 |
| 5,100,029 | 3/1992 | Meshberg | 239/333 X |
| 5,110,052 | 5/1992 | Graf et al. | 239/333 |
| 5,137,180 | 8/1992 | Kieras | 222/108 |
| 5,147,087 | 9/1992 | Fuchs | 239/333 |
| 5,163,588 | 11/1992 | Cater | 222/321.2 |
| 5,234,135 | 8/1993 | Lafosse et al. | 222/321.2 |
| 5,284,276 | 2/1994 | Cater | 222/321 |
| 5,335,830 | 8/1994 | Cater | 222/153 |
| 5,348,189 | 9/1994 | Cater | 222/1 |
| 5,350,116 | 9/1994 | Cater | 239/333 |
| 5,358,146 | 10/1994 | O'Neill | 222/321 |

FOREIGN PATENT DOCUMENTS

| | | |
|---|---|---|
| 0289855 | 11/1988 | European Pat. Off. . |
| 0342651 | 11/1989 | European Pat. Off. . |

*Primary Examiner*—Joseph Kaufman

*Attorney, Agent, or Firm*—Beveridge, DeGrandi, Weilacher & Young, L.L.P.

[57] ABSTRACT

An atomizing pump (FIG. 1) has a piston (3) slidable in a cylinder (5) to expel liquid from a pump chamber (4). A valve member (8) is slidable in a stem (6) of the piston defining a liquid delivery duct (7). A separately formed cylindrical extension (11) of the valve member is movable in and out of sealing contact with the valve member to open and close a liquid inlet port (105) to the chamber (4). The valve member has a core (102) projecting within the cylindrical extension and having a projecting stop formation (103) which co-operates with a stop formation (104) on the cylindrical extension to limit lost motion between the valve member and cylindrical extension. The valve member is biased into an extended position by a spring acting on the stop member projecting from the core so that the spring extends between the core and the cylindrical extension. This arrangement helps maintain alignment between the pump components and resists buckling of the spring. A bottom end of the cylindrical extension makes sliding contact with an internal wall of a tubular extension (16) of the pump body, continuous sliding contact being maintained to prevent clogging when dispensing water based products.

9 Claims, 6 Drawing Sheets

FIG. 6.
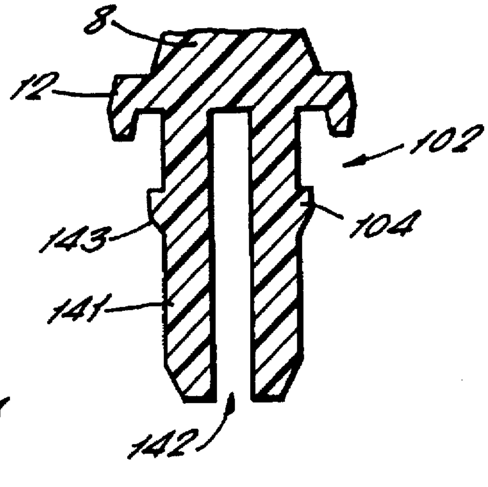
FIG. 7.
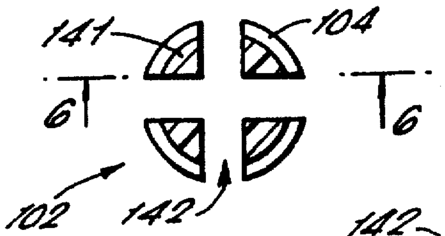
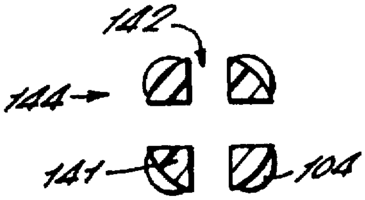
FIG. 8.
FIG. 9.
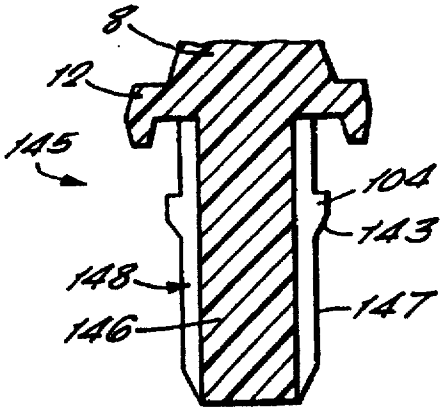
FIG. 10.
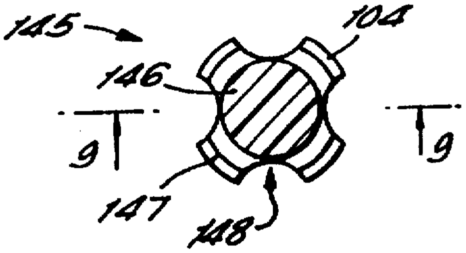
FIG. 11.
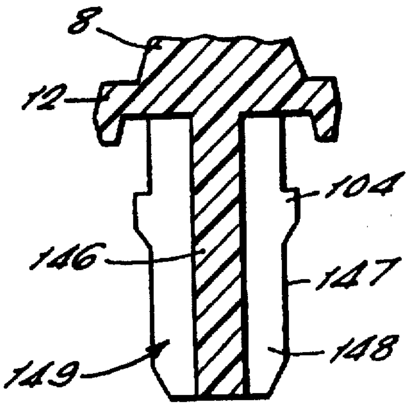
FIG. 12.
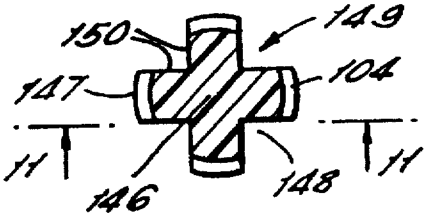

APPARATUS FOR DISPENSING LIQUID IN AEROSOL SPRAY FORM

RELATED APPLICATION DATA

This application claims priority benefits under 35 U.S.C. §120 based on U.S. patent application Ser. No. 08/190,923, filed in the U.S. PTO on Feb. 3, 1994 now U.S. Pat. No. 5,458,280.

INTRODUCTION AND BACKGROUND

This invention relates to pump dispensers of the type used to dispense liquid from a container in aerosol spray form.

It is known from U.S. Pat. No. 5,163,588 to provide an atomizing pump dispenser primarily for use with water based formulations and specifically adapted to avoid clogging. A pump chamber is replenished during a return stroke of the pump via an inlet port defined between a valve member and a cylindrical extension of the valve member.

A spring acting on the valve member also serves to limit relative displacement of the cylindrical extension relative to the valve member throughout the stroke of the pump and in the rest position of the pump both the cylindrical extension and the valve member make contact with an extremity of the spring.

SUMMARY OF THE INVENTION

According to the present invention there is disclosed apparatus for dispensing liquid from a container comprising a piston slidable in a cylinder to vary the volume of a chamber defined therein, a tubular stem integral with the piston and extending outwardly of the chamber to define a liquid delivery duct, a valve member slidably received in the stem and co-operable therewith in a rest position to close the delivery duct, the valve member having a separately formed cylindrical extension defining an inner wall of the chamber and having an outer periphery slidingly engaging an internal surface of a tubular extension of the cylinder, the cylindrical extension defining a conduit communicating in use with the container, a spring extending through the conduit and acting on the valve member to bias the valve member into the rest position, and connecting means providing lost motion between the valve member and the cylindrical extension whereby the valve member and the cylindrical extension are movable into and out of engagement to respectively close and open a liquid inlet port defined therebetween and communicating between the conduit and the first chamber, wherein the connecting means comprises co-operating stop formations of the valve member and the cylindrical extension respectively, the valve member comprising a core extending within the cylindrical extension, and wherein the spring extends into an annular space between the core and the cylindrical extension.

An advantage of this apparatus is that the valve member and the cylindrical extension can be pre-assembled as a sub-assembly thereby simplifying the assembly of the apparatus. The spring can thereby be introduced into the apparatus at a subsequent stage of assembly.

An advantage of the spring extending into the annular space between the core and the cylindrical extension is that the presence of the core holds the spring in coaxial alignment with the valve member and the spring in turn provides a support for maintaining coaxial alignment of the cylindrical extension. This nested arrangement helps to prevent misalignment and subsequent jamming of the cylindrical extension and valve member and also helps to prevent buckling of the spring.

Preferably the spring acts on the stop formation of the valve member.

Such an arrangement is convenient in that the stop formation defines both the limit of lost motion of the valve member and cylindrical extension and at the same time provides a point of contact between the spring and the valve member.

It is preferable for the spring to be a helical compression spring and its resistance to buckling under compressive load depends to some extent on the diameter of the spring relative to its length. The above arrangement in which the spring extends externally of the core thereby provides for the maximum available diameter helical spring to be utilized with resulting stability.

Preferably the valve member comprises a core extending within the cylindrical extension, the core comprising an interrupted annular outwardly projecting annular flange co-operable with an inwardly projecting annular flange of the cylindrical extension, the outwardly and inwardly projecting flanges thereby constituting the stop formations of the connecting means.

The interrupted flange thereby defines axially extending channels through which liquid can flow freely through the conduit.

A further advantage is that thrust transmitted from the valve member to the cylindrical extension by contact between the flanges is circumferentially distributed thereby avoiding any tendency of the cylindrical extension to move out of coaxial alignment with the valve member. Such misalignment could otherwise interfere with the proper operation of the apparatus by inhibiting relative movement between the core and the cylindrical extension. It is a particular disadvantage of the prior art apparatus referred to above that a helical spring tends to apply thrust locally to the cylindrical extension in a manner which tends to wedge the cylindrical extension against the core of the valve member with a consequent tendency to jam. The apparatus of the present invention, by avoiding the problem of jamming, thereby achieves improved reliability in opening and closing of the liquid inlet port and thereby achieves greater consistency in the performance of the apparatus.

A further advantage of the apparatus of the present invention is to provide greater flexibility in the choice of critical design parameters relevant to the performance of the pump by allowing the diameter of the cylindrical extension to be independent of the spring diameter since it is no longer a requirement for the spring to make contact with both the valve member and the cylindrical extension.

The core may comprise a plurality of circumferentially distributed parallel legs, the outwardly projecting flange being interrupted by axially extending flow channels defined between the legs.

Preferably the legs are resiliently deformable so as to move radially relative to the core axis during assembly of the core with the cylindrical extension by means of ramp formations formed on one or other of the legs and the cylindrical extension. Alternatively the core may comprise a central portion with circumferentially distributed axially extending recesses defining flow channels.

Such a core may be of cruciform radial cross section.

Preferably the valve member is co-operable with the stem to define a closable liquid outlet port at a location defined by contact between a tip portion of the valve member and an annular valve seat of the stem.

By this arrangement the liquid outlet port is defined at a location remote from the chamber and adjacent to the discharge nozzle of the apparatus. The volume of residual liquid retained downstream of the liquid outlet port after use is thereby minimized.

DESCRIPTION OF DRAWINGS

Preferred embodiments of the present invention will now be described by way of example only and with reference to the accompanying drawings of which

FIG. 6 is an enlarged sectioned elevation of the lower portion of the valve member and core of the apparatus shown in FIG. 1, sectioned at VI—VI of the plan view of FIG. 7;

FIG. 7 is a plan view of the core of FIG. 6;

FIG. 8 is a sectioned plan view of a modified core for use in the apparatus of FIG. 1;

FIG. 9 is a sectioned elevation of the lower portion of the valve member and a further alternative core for use in apparatus of the type shown in FIG. 1, sectioned at IX—IX of the plan view of FIG. 10;

FIG. 10 is a plan view of the alternative core of FIG. 9;

FIG. 11 is a sectioned elevation of the lower portion of the valve member and a further alternative core for use in apparatus of the type shown in FIG. 1, sectioned at XI—XI of the plan view of FIG. 12; and FIG. 12 is a plan view of the alternative core of FIG. 11.

DETAILED DESCRIPTION OF THE INVENTION

Figure 1:
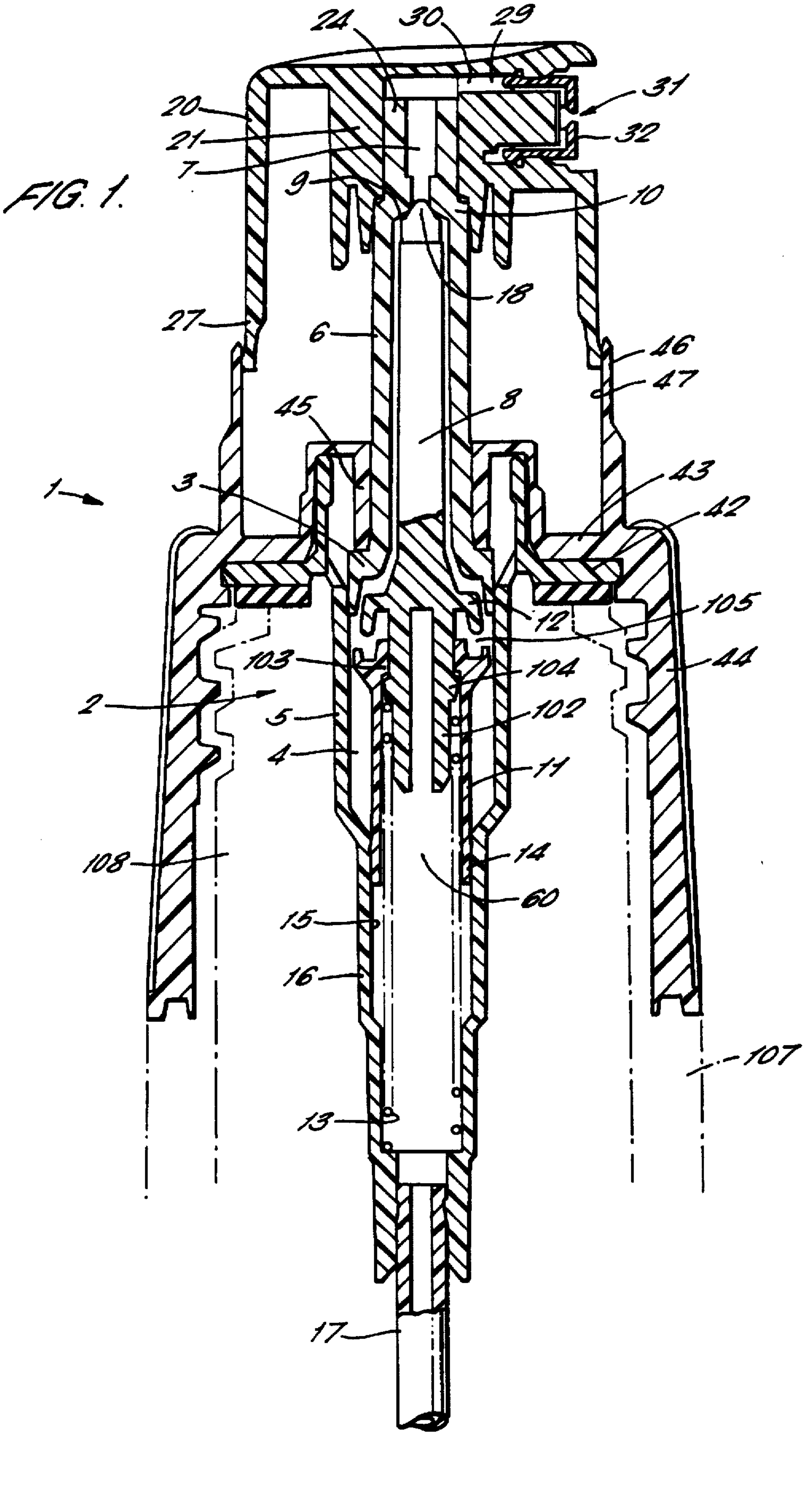
FIG. 1 is a sectioned elevation of an apparatus in accordance with the present invention shown in the rest position.

In FIG. 1 an apparatus 1 has a pump 2 constituted by a piston 3 which is axially movable in a chamber 4 defined by a cylinder 5. A stem 6 formed integrally with the piston 3 is tubular so as to define a liquid delivery duct 7 through which liquid content of the chamber 4 is expelled during a dispensing stroke during which the stem moves downwardly towards the cylinder 5. The stem 6 constitutes an actuating member for effecting movement of the piston 3.

A valve member 8 extends axially within the liquid delivery duct 7 and is axially movable into and out of engagement with an annular valve seat 9 constituted by a radially inwardly projecting flange 10 of the stem 6.

The valve member 8 has an associated cylindrical extension 11 defining a conduit 60 and which is formed separately from and is axially movable relative to an enlarged lower portion 12 of the valve member.

The enlarged lower portion 12 and the valve member 8 are upwardly biassed by a coil compression spring 13 such that a tip portion 18 of the valve member cooperates with the valve seat 9 to form a liquid outlet valve (18,9) which is normally closed as shown in the rest position in FIG. 1.

The apparatus 1 has an actuator 20 having a stem engaging portion 21 defining an axial bore within which an end portion 24 of the stem 6 is received as a tight fit thereby securing the actuator 20 in fixed relationship to the stem 6.

A depending skirt 27 of the actuator is spaced radially outwardly of the stem engaging portion 21.

The actuator 20 further defines a radially extending bore 29 which defines a dispensing channel 30 through which liquid is dispensed so as to emerge from a nozzle aperture 31 defined by a nozzle 32 located in the bore.

The cylindrical extension 11 has a lower end portion 14 which is slidingly engaged with an internal surface 15 of a tubular extension 16 depending from the cylinder 5 and the tubular extension 16 is connected to a dip tube 17 through which liquid is drawn from a container 107. The cylinder valve extension 11 is of smaller diameter than the cylinder 5 such that an annular volume constituting the chamber 4 is defined between the cylinder and the cylindrical extension. The lower end portion 14 is maintained in continuous sliding engagement with the inner surface 15 throughout the entire stroke of the apparatus 1.

The cylindrical extension 11 defining conduit 60 is captively retained in coaxial relationship with a core 102 integral with the lower portion 12 of the valve member 8, cooperating annular flanges 103 and 104 being provided on the cylindrical extension 11 and the core 102 respectively. The flanges 103 and 104 constitute co-operating stop formations of the cylindrical extension and the core respectively, being operable to limit axial separation of the cylindrical extension 11 from the enlarged lower portion 12 of the valve member 8. The flange 104 is interrupted by gaps allowing liquid flow.

The upper end portion of the spring 13 extends into an annular space defined between the core 102 and the cylindrical extension 11. The spring 13 is nestedly received in sliding contact with both the core 102 and the cylindrical extension 11, thereby being supported in coaxial alignment with the core and hence the valve member 8 and at the same time supporting the cylindrical extension in coaxial alignment with the core. In this way misalignment of the cylindrical extension is avoided and alignment of the spring is maintained in order to avoid buckling under compressive load.

In the rest position shown in FIG. 1, the cylindrical extension 11 is spaced from the enlarged lower portion 12 to define a liquid inlet port 105 communicating between the conduit 60 and the chamber 4.

The coil compression spring 13 contacts the core 102 and biases the core into the position shown in FIG. 1 such that in the rest position the stem 6 projects fully in a direction away from the chamber 4 and the actuator 20 is in its fully raised position.

Figure 2:
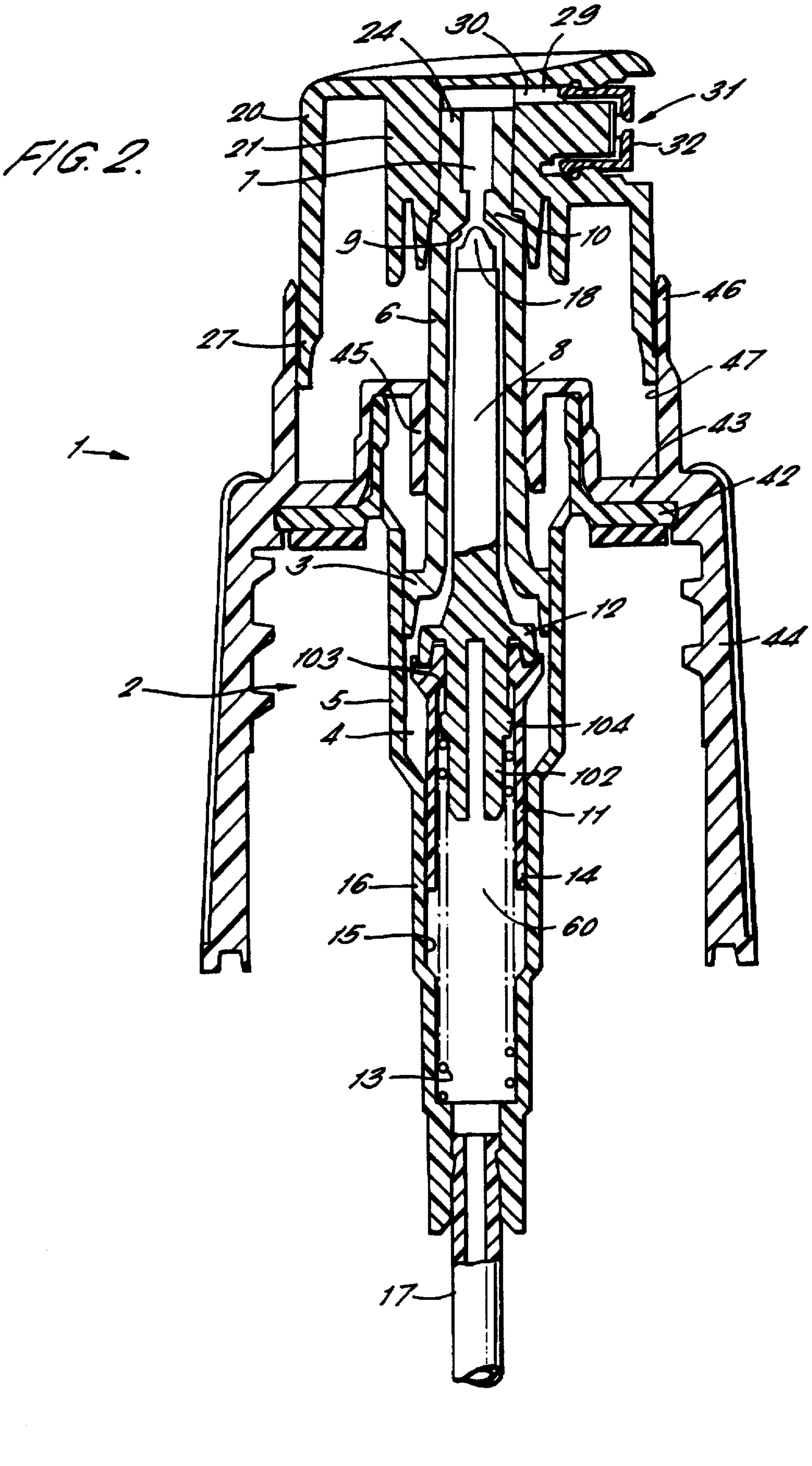
FIG. 2 is a sectioned elevation of the apparatus of FIG. 1 at an intermediate position during an actuating stroke.

Friction between the lower end portion 14 and the internal surface 15 maintains the cylindrical extension 11 in its initial rest position during an initial part of the actuating stroke when the actuator 20 and the stem 6 are depressed. After taking up this initial lost motion, the liquid inlet port 105 is closed as shown in FIG. 2 allowing liquid pressure to be built up within the chamber 4 as the piston 3 moves into the chamber 4 thereby decreasing the volume of the chamber. Excess pressure in the chamber 4 results in movement of the valve member 8 relative to the stem 6 such that it becomes unseated from the seat 9 and liquid is dispensed under pressure through the liquid delivery duct 7. This movement is achieved by an imbalance of axial forces acting on the valve member 8 due to the enlarged lower portion 12 having a greater cross section than the tip portion 18 so that there is an imbalance between the upper and lower surface areas of the valve member to which liquid pressure is applied.

Figure 3:
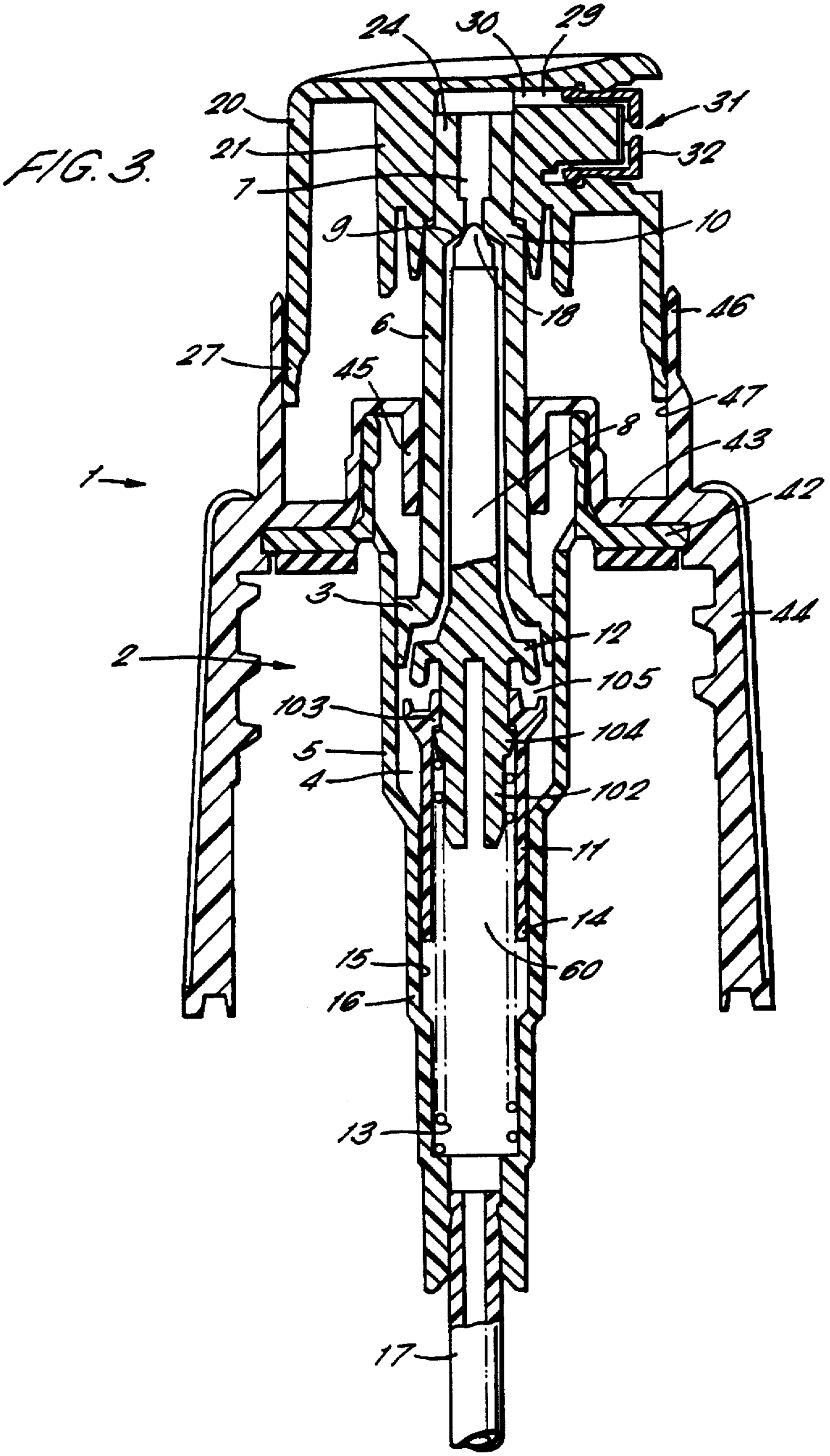
FIG. 3 is a sectioned elevation of the apparatus of preceding Figures at an intermediate position during the return stroke.

During the return stroke as shown in FIG. 3 in which the actuator 20 and stem 6 move upwardly, frictional forces between the lower end portion 14 and the internal surface 15 result in the separation of the cylindrical extension 11 from the enlarged lower portion 12 thereby opening the liquid inlet port 105. Liquid drawn through the dip tube 17 from the container 107 is then able to recharge the chamber 4 via the liquid inlet port 105 during the return stroke. The cylindrical extension 11 and the enlarged lower portion 12 thereby constitute a liquid inlet valve of the pump.

At successive actuations of the apparatus 1, liquid is thereby pumped such that pressurized liquid is expelled via the dispensing channel 30 so as to emerge in atomized form from the atomizing nozzle 32.

In FIG. 1 the apparatus 1 is shown connected to the container 107 by means of a screw fitting 44, the container having in its normal orientation as illustrated in the FIG. 1 a quantity of liquid contained in its lower portion and a volume of air occupying a head space 108.

The cylinder 5 and tubular extension 16 are formed integrally with a body 42 which is connected to a casing 43 of the apparatus 1 which includes the screw fitting 44 for connection to the container 107, the casing being formed integrally with an annular seal member 45 through which the stem 6 is axially slidable.

The casing 43 further includes a tubular skirt engaging portion 46 projecting upwardly into telescopic engagement with the depending skirt 27, the skirt 27 being slidably received in engagement with an internal cylindrical surface 47 of the skirt engaging portion.

Figure 4:
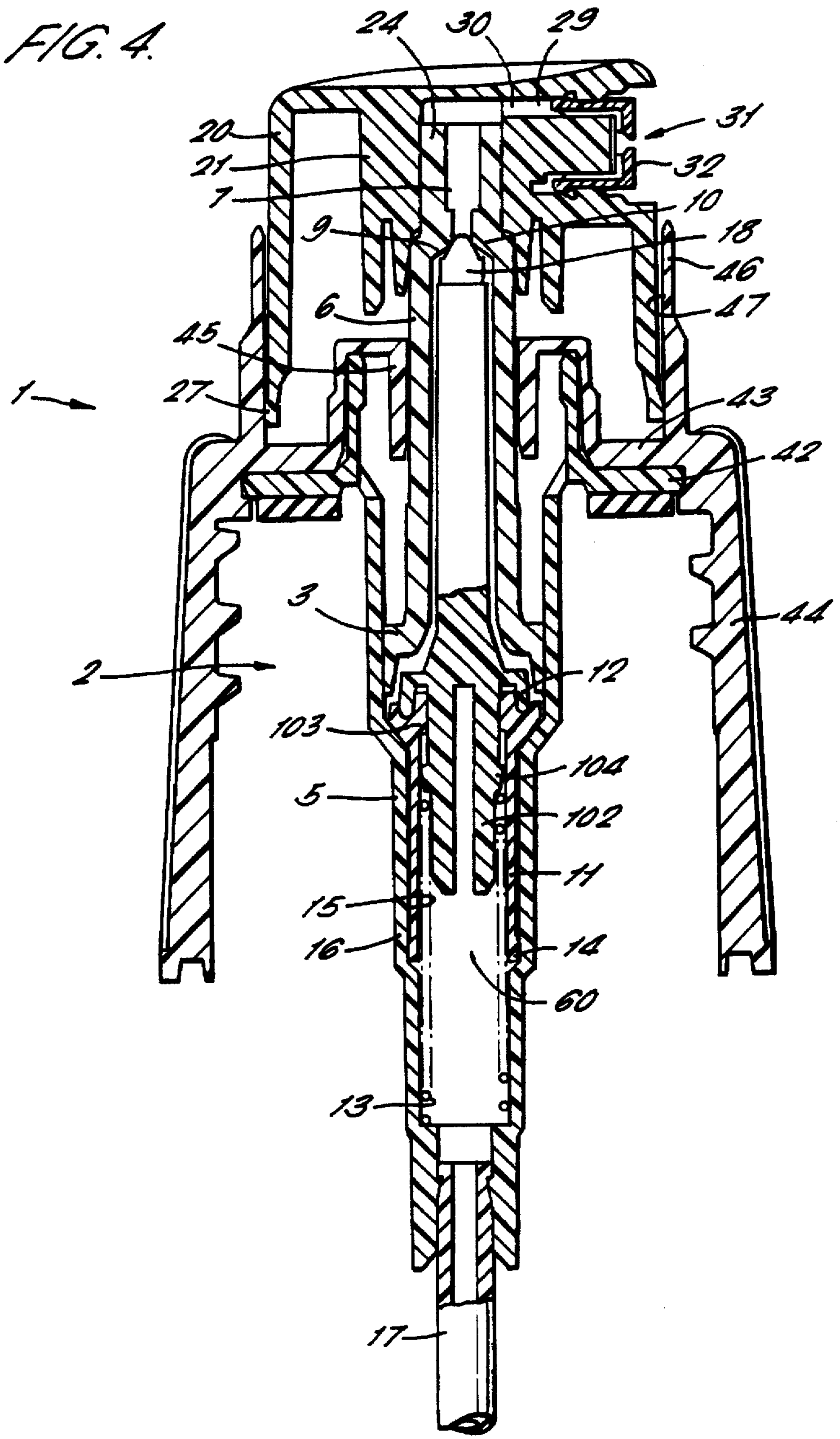
FIG. 4 is a sectioned elevation of the apparatus of preceding Figures showing the actuator in a fully depressed condition.

As can be seen from FIG. 4, the volume of the chamber 4 is reduced to an absolute minimum at the completion of the actuating stroke by shaping the valve member 8 to be conformable to the interior of the piston 3 and by virtue of the constructional features of the cylindrical extension 11 and lower portion 12 of the valve member. A high compression ratio of the pump 2 is thereby achieved and this facilitates the priming of the chamber 4 with liquid.

Figure 5:
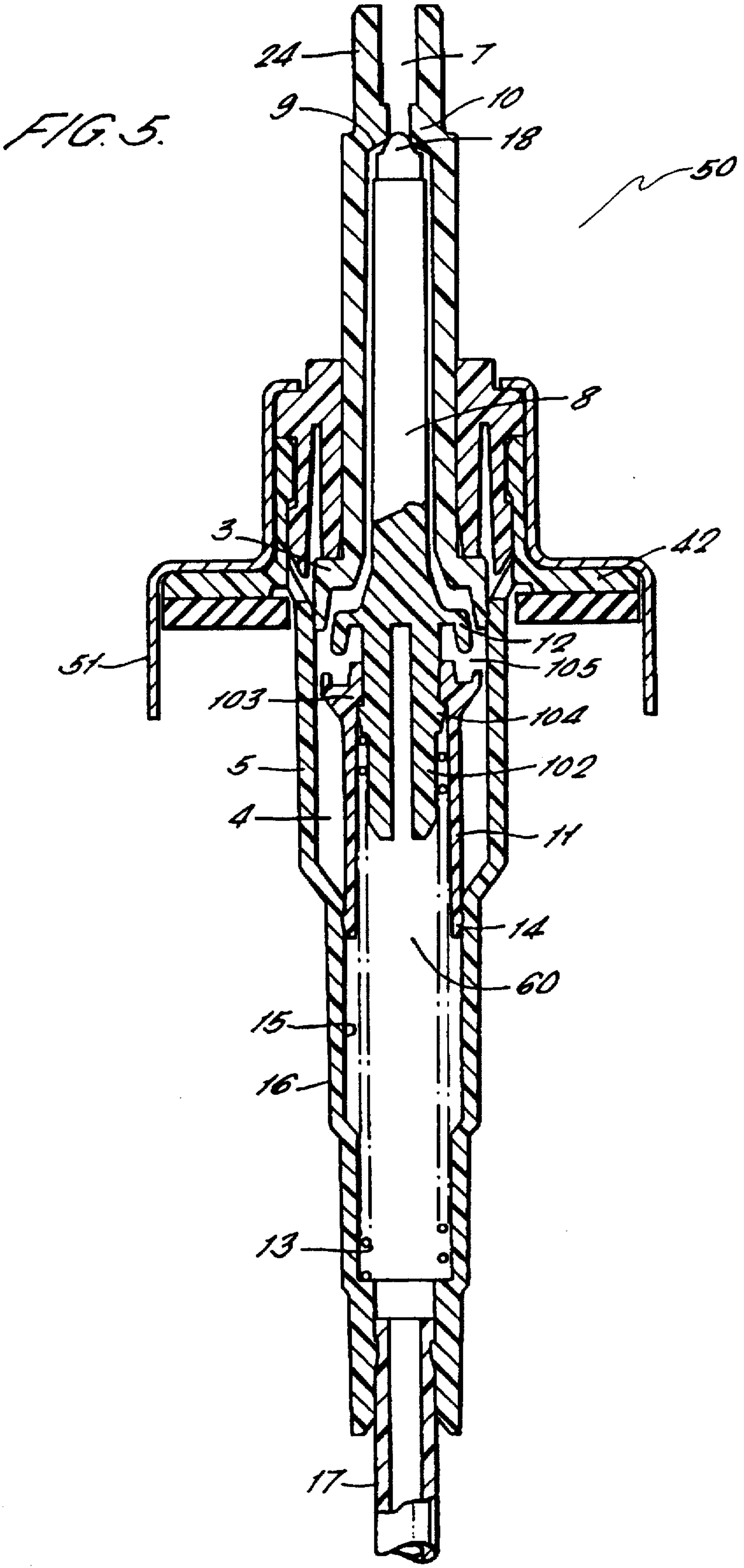
FIG. 5 is a sectioned elevation of an alternative apparatus similar to the apparatus of preceding Figures but having a ferrule adapted for crimping onto the mouth of a cooperating container.

FIG. 5 illustrates a modified apparatus 50 in which the body 42 is securable to a container (not shown) by a metal ferrule 51 adapted for crimping over a mouth of the container.

The construction of the core 102 of the apparatus 1 shown in FIG. 1 is illustrated further in FIGS. 6 and 7. The core 102 has four flange portions 104 which together constitute the interrupted annular flange 104 referred to above, each formed on a respective leg 141 formed integrally with the enlarged lower portion 12.

The legs 141 extend paraxially with the valve member 8 and are circumferentially spaced apart as shown in FIG. 7 to define axially extending flow channels 142 allowing liquid to freely flow between the conduit 60 and the liquid inlet port 105.

This arrangement also facilitates assembly of the core 102 with the cylindrical extension 11, each of the flange portions 104 having a leading ramped surface 143 such that when the core 102 is inserted into the extension 11 the legs are deformed inwardly by ramp action until the assembled position is reached in which the legs snap back to their rest position. Once assembled by this snap action, the core 102 remains connected to the extension 11 as a sub-assembly in a manner providing the lost motion referred to above.

In the assembled apparatus 1, the spring 13 bears axially against the flange portions 104 while the flange 103 formed on the enlarged lower portion 12 of the valve member 8 is spaced from the upper end of the spring by the flange 104 of the core 102.

A modified core 144 is illustrated in FIG. 8 and differs from the core of FIGS. 1 to 7 in that each of the flange portions 104 has a profile of smaller radius when viewed in axial projection than the radius of the outer circumference of the legs 141.

A further alternative core 145 is illustrated in FIGS. 9 and 10 and comprises a solid central portion 146 depending from the enlarged lower portion 12 of the valve member 8. The outer periphery of the solid central portion 146 defines a cylindrical surface 147 interrupted by axially extending fluted recesses 148 which constitute flow channels for liquid passing from the conduit 60 to the liquid inlet port 105.

The shape of the recesses 148 is arcuate in profile when viewed in axial projection. Recesses of other shapes may also be utilized in accordance with the present invention including for example recesses of rectangular sided profile.

Flange portions 104 including ramped surfaces 143 project radially from the cylindrical surface 147 and function in like manner to those of the cores 102 and 144 during assembly of the core 145 with the cylindrical extension 11 except that resilient deformation of the cruciform core is achieved by radial compression of the plastics material forming the core.

A further alternative core 149 is illustrated in FIGS. 11 and 12. The core 149 is similar to the core 145 in that it includes a solid central portion 146 and a cylindrical surface 147 interrupted by axially extending recesses 148. The recesses 148 are however of V shaped cross section when viewed in axial projection so as to define side walls 150 arranged at right angles to one another. When viewed in axial projection as shown in FIG. 12 the core 149 thereby assumes a cruciform appearance. The core 149 is assembled with the cylindrical extension 11 in like manner to the method of assembly described above with reference to the core 145.

In each of the preferred embodiments, the cylindrical extension 11 makes continuous sliding contact with the internal surface 15 of the tubular extension 16. The lower end portion 14 is maintained to an extent under radial compression within the tubular extension 16 by being a force fit. Such an arrangement has been found preferable to alternative constructions in which the cylindrical extension 11 would be made to slide externally on a re-entrant portion of the tubular extension, a problem with such alternative constructions being that it is found necessary to disengage the tubular extension from the sliding surface in the rest position to avoid deformation over time into a set position in which good sealing contact is no longer made. In the configuration shown in the preferred embodiments however the cylindrical extension 11 when held in radial compression is found to be more resistant to deformation so that separation in the rest position is not necessary.

By maintaining continuous sealing contact in the rest position as shown in the preferred embodiments, emptying of the first chamber 4 via the dip tube 17 during prolonged periods of non-actuation is avoided.

The shape of the core may be varied in a number of ways within the scope of the present invention. For example, the core 102 of FIGS. 6 and 7 may be modified to include a plurality of legs which are other than four in number. The minimum number of legs being two, in which configuration the core would appear cylindrical in shape with a diametrically extending slot dividing the core into to parallel legs. Preferably where three, five or more legs were utilized the legs would be equispaced circumferentially.

The core 145 shown in FIGS. 9 and 10 may similarly by modified to include a different number of recesses 148, one or more of such recesses being provided to ensure adequate axial flow of liquid. The profile of the recesses 148 may alternatively be of square or triangular profile when viewed in axial projection.

Any of the cores described above with reference to FIGS. 6, 7, 9, 10, 11 and 12 and the modifications thereto may alternatively be modified to include flanges of the type shown as flange 104 in FIG. 8 in which the flange portions are formed as localized projections having arcuate profile of smaller radius than the core when viewed in axial projection.

I claim:

1. Apparatus for dispensing liquid from a container comprising a piston slidable in a cylinder to vary the volume of a chamber defined therein, a tubular stem integral with the piston and extending outwardly of the chamber to define a liquid delivery duct, a valve member slidably received in the stem and co-operable therewith in a rest position to close the delivery duct, the valve member comprising a core extending within a separately formed cylindrical extension, said cylindrical extension defining an inner wall of the chamber and having an outer periphery in continuous sliding contact with and under radial compression from an internal surface of a tubular extension of the cylinder, the cylindrical extension defining a conduit communicating in use with the container, a spring extending through the conduit and only acting on a stop formation on an external surface of the core of the valve member to bias the valve member into the rest position, and connecting means providing lost motion between the valve member and the cylindrical extension whereby the valve member and the cylindrical extension are movable into and out of engagement to respectively close and open a liquid inlet port defined therebetween and communicating between the conduit and the chamber, wherein the connecting means comprises the stop formation on the core and a co-operating stop formation on an internal surface of the cylindrical extension and wherein the spring extends into an annular space between the core and the cylindrical extension.

2. Apparatus as claimed in claim 1 wherein the core comprises an interrupted annular outwardly projecting annular flange co-operable with an inwardly projecting annular flange of the cylindrical extension, the outwardly and inwardly projecting flanges thereby constituting the stop formations of the connecting means.

3. Apparatus as claimed in claim 3 wherein the core comprises a plurality of circumferentially distributed parallel legs, the outwardly projecting flange being interrupted by axially extending flow channels defined between the legs.

4. Apparatus as claimed in claim 3 wherein the legs are resiliently deformable so as to move radially relative to the core axis during assembly of the core with the cylindrical extension by means of ramp formations formed on at least one of the legs and the cylindrical extension.

5. Apparatus as claimed in claim 2 wherein the core comprises a central portion with at least one circumferentially distributed axially extending recesses defining flow channels.

6. Apparatus as claimed in claim 5 wherein the core is of cruciform radial cross section.

7. Apparatus as claimed in claim 1 wherein the valve member is co-operable with the stem to define a closable liquid outlet port at a location defined by contact between a tip portion of the valve member and an annular valve seat of the stem.

8. Apparatus as claimed in claim 1 wherein the spring is a helical compression spring making sliding contact with an internal cylindrical surface of the cylindrical extension.

9. Apparatus as claimed in claim 1 wherein the spring is supported in sliding contact with an external surface of the core.

* * * * *